US012130356B2

(12) United States Patent
Michelini

(10) Patent No.: US 12,130,356 B2
(45) Date of Patent: Oct. 29, 2024

(54) METHOD AND APPARATUS FOR BLURRING EFFECT MITIGATION IN GROUND-BASED RADAR IMAGES

(71) Applicant: IDS GEORADAR S.R.L., Milan (IT)

(72) Inventor: Alberto Michelini, Pisa (IT)

(73) Assignee: IDS GEORADAR S.R.L., Milan (IT)

( * ) Notice: Subject to any disclaimer, the term of this patent is extended or adjusted under 35 U.S.C. 154(b) by 0 days.

(21) Appl. No.: 17/378,578

(22) Filed: Jul. 16, 2021

(65) Prior Publication Data

US 2022/0018953 A1 Jan. 20, 2022

(30) Foreign Application Priority Data

Jul. 16, 2020 (IT) .................. 102020000017329

(51) Int. Cl.
*G01S 13/90* (2006.01)

(52) U.S. Cl.
CPC ................ *G01S 13/9047* (2019.05)

(58) Field of Classification Search
CPC ............ G01S 13/9047; G01S 13/9029; G01S 13/9023; G01S 13/9021; G01S 7/414;
(Continued)

(56) References Cited

U.S. PATENT DOCUMENTS 8,698,668 B2 * 4/2014 Hellsten .............. G01S 13/9017
342/25 R
11,092,669 B1 * 8/2021 Wolford ................ G01S 7/295
(Continued)

FOREIGN PATENT DOCUMENTS

JP 2015052549 A * 3/2015

*Primary Examiner* — Bernarr E Gregory
*Assistant Examiner* — Juliana Cross
(74) *Attorney, Agent, or Firm* — Maschoff Brennan

(57) ABSTRACT

In a method for mitigating the blurring effect in a radar image (40) obtained by a ground-based radar system, thereof, a Pulse Repetition Frequency (PRF) value is selected (110) in a radar sensor unit (30) such that radial velocity measurements of the targets of an observed scenario can be made up to a maximum unambiguous velocity $v_{max}$, a radial velocity threshold is also selected (101) to discriminate between substantially stationary targets and possible fast-moving targets having radial velocities $v_{R,j} \leq v^*$ and $v_{R,j} > v^*$, respectively. The scenario is conventionally scanned (120) by emitting transmission signals to the targets and receiving corresponding backscattered signals (23) from which raw data (25) are extracted (130), the latter in turn are Doppler-processed (140) so as to discriminate first and second data (31, 32) related to the substantially stationary and to the fast-moving target(s), respectively, according to whether the measured radial velocities ($v_R$) are lower than the radial velocity threshold ($v^*$) or not, respectively; second data are removed (150) from the Doppler-processed data (27) and radar image (40) is formed from remaining first data, i.e., based on the substantially stationary targets only. The method allows reducing the occurrence of artifacts due to fast-moving objects that are systematically present or that turn up in the scenario at the moment of taking an image thereof, such as truckloads or vehicle in general, as well as crane mobile portion in scenarios like a portion of a mine. (FIG. 11).

4 Claims, 9 Drawing Sheets

(58) Field of Classification Search
CPC ........ G01S 13/89; G01S 7/415; G01S 13/589; G01S 13/52; G01S 13/9004
See application file for complete search history.

(56) References Cited

U.S. PATENT DOCUMENTS

| | | | |
|---|---|---|---|
| 2004/0012516 A1* | 1/2004 | Schiffmann | G01S 13/878 |
| | | | 342/70 |
| 2017/0031013 A1* | 2/2017 | Halbert | G01S 7/414 |
| 2017/0269193 A1* | 9/2017 | Yamaoka | G01S 13/53 |
| 2017/0269201 A1* | 9/2017 | Adachi | G01S 13/931 |
| 2018/0106896 A1* | 4/2018 | Rohani | G01S 13/89 |
| 2020/0132850 A1* | 4/2020 | Crouch | G01S 17/931 |

* cited by examiner

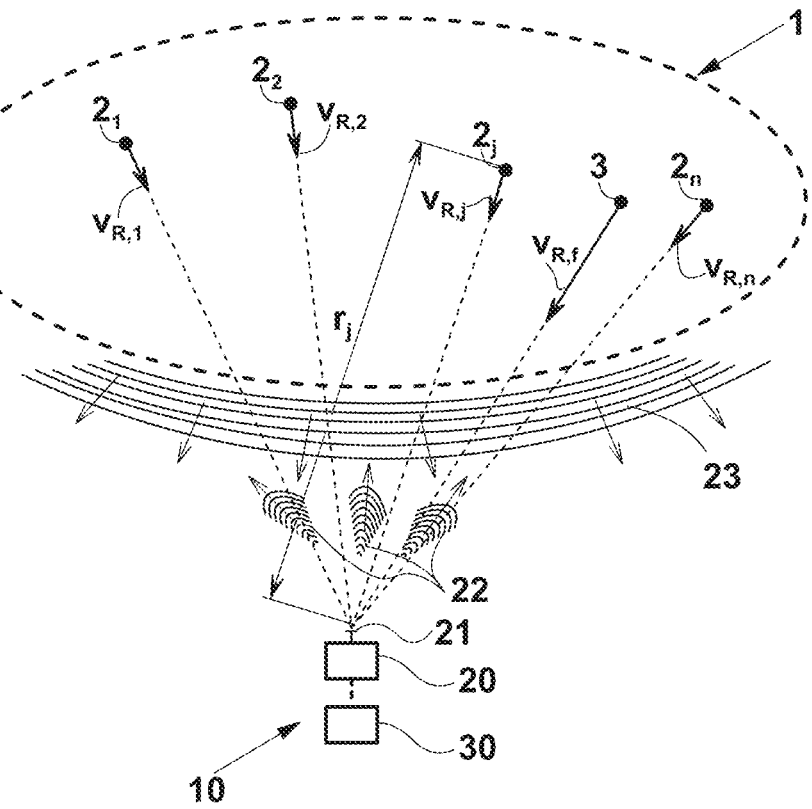
Fig. 1
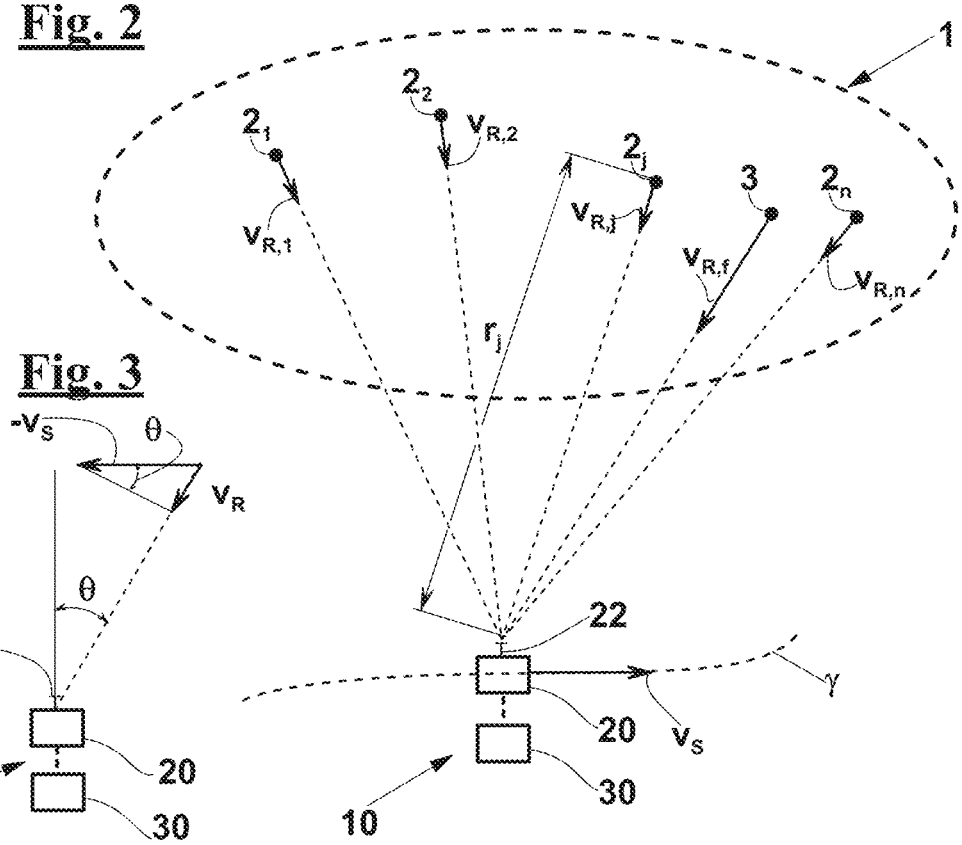
Fig. 2
Fig. 3

METHOD AND APPARATUS FOR BLURRING EFFECT MITIGATION IN GROUND-BASED RADAR IMAGES

FIELD OF THE INVENTION

The present invention relates to a method for mitigating the blurring effect in images obtained by a ground-based (GB) radar system, in particular by a ground-based, synthetic aperture radar (GB-SAR) system.

The invention also relates to a GB radar system and in particular to a GB-SAR radar system to carry out such method.

DESCRIPTION OF THE PRIOR ART—TECHNICAL PROBLEM

GB radar is a radar-based terrestrial remote sensing imaging technique suitable for providing precise information on the deformation and topography of a measured scene, which can be derived from the GB radar complex images by exploiting interferometric techniques. Such outstanding features as high sensitivity to small deformations, long measurements range, short acquisition time and large imaging capability make this technique complementary to such deformation measurement techniques as total stations, laser scanner, GNSS receivers, satellite SAR. FIG. 1 schematically shows a radar system 10 comprising a radar antenna unit 20 and a radar sensor unit 30. Radar antenna unit 20 includes one or more antennas 21 to emit transmission signals 22 and, in response thereto, to receive backscattered signals 23 from targets $2_1, 2_2, \ldots 2_j, \ldots 2_n$, 3 that are present in a monitored scenario 1.

However, conventional GB radar image processing relies on a stationary target scene, that is, no appreciable movement is supposed to occur in the monitored scenario during the acquisition of an image. On the contrary, moving targets 3 can be present in scenario 1 along with substantially stationary targets $2_j=1 \ldots n$, the former having a relative (i.e., measured with respect to radar antenna unit 20) radial velocity $v_{R,f}$ that can be considerably higher than the relative radial velocity $v_{R,j}$ of the latter. Moving target 3 can therefore cause an unwanted blurring effect in the image produced by a GB radar system.

More in particular, a GB-SAR system is a class of GB radar systems that is configured to repeat microwave signal transmission and reception steps while travelling along a given trajectory γ with a given scan speed $v_s$, as schematically depicted in FIG. 2.

The imaging capability is achieved by exploiting the Synthetic Aperture Radar (SAR) technique. SAR focusing technique exploit Doppler principle: by measuring the relative radial speed $v_R$ between the moving sensor and a stationary target 2, as shown in FIG. 3, a target angular coordinate θ can be retrieved by the relationship:

$$v_S \cdot \sin(\theta) = v_R, \qquad [1]$$

as it can be seen in FIG. 3, in which the velocity vectors $v_S$ and $v_R$ are represented in a reference system integral to the radar antenna unit.

Conventional SAR image processing relies on a stationary target scene as well, therefore, in a SAR image a moving target appears unfocused or smeared.

This effect is particularly evident in GB-SAR images, as shown in FIG. 4: the signal associated to a moving target affects all the neighbouring pixels lying in the same radial ranges as the moving target during the acquisition of the image. This results in a plurality of arches forming circular crown sectors 91. Such an effect has been noticed since the earliest GB-SAR systems experiments.

Further examples of this effect are given in Jungner[1] and shown here in FIGS. 5 and 6, which are radar images obtained while monitoring a port area and a church façade, respectively. In FIG. 5, artifacts 92 were caused by the sideways movement of cruise ships, while in FIG. 6 artifacts 93 were due to the jib of a crane turning about a vertical mast, which affected therefore a wide portion of the radar image.

Until now, attempts to mitigate this problem have been made by trying to minimize the GB-SAR scanning time as, for instance, in Cuenca[2]. However, such an approach cannot be followed indefinitely: in order to maintain the total transmitted energy levels, while reducing scan times, increasingly higher power levels should be exploited, which is technically and economically disadvantageous. In any case, the effects of moving targets cannot be fully suppressed by decreasing the scanning time, as stated in the same work.

SUMMARY OF THE INVENTION

It is therefore an object of the present invention to provide a method for mitigating the blurring effect in GB-radar images, i.e., artifacts due to fast-moving targets that can be present in a scenario while acquiring radar image of the same.

It is a particular object of the invention to provide such a method that mitigate the blurring effect as it occurs in GB-SAR images, i.e., for suppressing unwanted fast-moving target contributions affecting the pixels lying at the same range as the fast-moving target.

It is another particular object of the invention to provide such a method that makes it unnecessary to reduce the scanning time in order to reduce the blurring effect, which, under a same transmitted power, would decrease the total energy level and therefore deteriorate radar image quality.

It is a further particular object of the invention to provide such a method that also makes it possible to track a fast-moving target in the scenario, in particular providing an alarm signal related thereto.

It is also an object of the invention to provide an apparatus to perform such a method.

These and other objects are achieved by a method and an apparatus for mitigating the above-mentioned undesired blurring effect in GB radar images. Particular exemplary embodiments of the invention are defined by the dependent claims.

According to one aspect of the invention, a method for mitigating the blurring effect in a ground-based radar image of a scenario including a plurality of targets, comprises the steps of:

prearranging a ground-based radar system including a radar antenna unit and a radar sensor unit, the radar sensor unit configured to obtain respective range measurements and respective radial velocity measurements of the targets, selecting, in the radar sensor unit, a Pulse Repetition Frequency value, i.e., the number of pulses transmitted in one time-unit by the radar antenna unit, such that the radial velocity measurements can be obtained up to a maximum unambiguous velocity of the targets;

selecting a radial velocity threshold, the radial velocity threshold defining, among the targets:

a plurality of substantially stationary targets having radial velocities lower than or equal to the radial velocity threshold;

at least one fast-moving target having a radial velocity higher than the radial velocity threshold;

scanning the scenario by the radar system, including steps of causing the radar antenna unit to emit transmission signals and of receiving backscattered signals from respective targets in response to the transmission signals;

extracting raw data from the backscattered signals, the raw data related to the targets including the substantially stationary targets and the fast-moving target;

Doppler-processing the raw data, obtaining Doppler-processed data containing said radial velocity measurements in order to discriminate:

first data that are related to the substantially stationary targets, and second data that are related to the fast-moving target, according to whether the radial velocity measurements are lower or not lower than the radial velocity threshold, respectively;

removing the second data from the Doppler-processed data, obtaining the first data alone, which are related to the substantially stationary targets;

forming a radar image of the scenario from the first data, the radar image representing only the substantially stationary targets.

According to another aspect of the invention, a ground-based radar system comprises:

a radar antenna unit and a radar sensor unit, the radar sensor unit configured to obtain respective range measurements and respective radial velocity measurements of targets that are present within a scenario;

the radar sensor unit configured with a Pulse Repetition Frequency such that the radial velocity measurements can be obtained up to a maximum unambiguous velocity, the radar sensor unit including a scan means for causing the radar antenna unit to emit transmission signals and to receive backscattered signals in response to the transmission signals from respective the targets, in such a way to scan the scenario;

a computation means for:

extracting raw data from the backscattered signals, the raw data related to the targets, which include the substantially stationary targets and the fast-moving target;

Doppler-processing the raw data, obtaining Doppler-processed data containing the radial velocity measurements;

discriminating first data that are related to the substantially stationary targets, and second data that are related to the fast-moving target, according to whether the radial velocities are lower or not lower than a predetermined radial velocity threshold, respectively;

removing the second data from the Doppler-processed data, so as to obtain the first data alone, which are related to the substantially stationary targets;

forming a radar image of the scenario from the first data, the radar image representing only the substantially stationary targets.

The radial velocity threshold can be selected above a minimum value. This radial velocity threshold minimum value is related to the finest resolution of the radial velocity measurements that the radar sensor unit can perform, and, in particular, can be selected as $v^*=\lambda/4\times(1/T_m)$, where $\lambda$ is the wavelength of the transmitted signal, usually a value between a few millimeters and a few centimeters in GB radar systems;

$T_m$ is the measurement time, i.e., the overall time the radar antenna unit spends to transmit signals and receive the signals as backscattered by that target.

The radial velocity threshold $v^*$ should be set at a value low enough to eliminate as many moving targets as possible from the radar image. $T_m$ should be high enough accordingly, but low enough to allow an acceptably short scan time, a trade-off value lying between a few seconds and a few minutes. As a consequence, the minimum radial velocity threshold $v^*$ is of the order of 1 mm/s.

According to the method and by the apparatus of the invention, the maximum unambiguous radial velocity that can be measured by the radar sensor unit can be calculated as $\lambda/4\times(PRF)$, where PRF is the Pulse Repetition Frequency. This depends therefore on the configuration of the radar sensor unit, in particular on the maximum range to be measured, and on the transmitted bandwidth. Typical PRF values are set between 50 Hz and 5 kHz. Therefore, the resulting maximum unambiguous radial velocity is in the order of magnitude of $10^{-1}$ to $10^1$ m/s.

According to the method and the apparatus of the invention, most of the effects of the moving targets can be filtered out of the radar image due to the use of Doppler processing that allows separating signals related to substantially stationary targets from signal related to fast-moving targets.

Advantageously, the Pulse Repetition Frequency of the radar sensor unit is selected in such a way that the maximum unambiguous velocity is higher than the expected radial velocity of the fast-moving target, or of the fastest moving target, if more than one fast-moving target are present in the scenario. This way, all the fast-moving targets, as previously defined, can be advantageously removed from the radar image.

In one embodiment, the step of scanning the scenario comprises a step of mechanically changing the position of the radar antenna unit along a trajectory at a predetermined scan speed. In another aspect of the invention, the radar system is a ground-based synthetic aperture radar (GB-SAR) system, in which the scan means is configured to mechanically actuate such a step of scanning the scenario. In comparison with GB real aperture radar systems (GB-RAR), GB-SAR systems allow to achieve a better angular resolution, a faster scan time, a longer range of measurement with a more compact design.

In this embodiment, preferably, the radial velocity threshold is set equal to the scan speed of the radar antenna unit along the above trajectory. The computation means of the corresponding radar system are therefore configured to discriminate the first and the second data by comparing the radial velocities with the scan speed.

According to this embodiment of the invention, an approach is proposed to solve the above-mentioned technical problem of mitigating blurring effect that is different from the approach of the cited prior art, which consists in minimizing the GB-SAR scanning time. In fact, from the relationship [1] it is clear that the radial relative velocity $|v_R|$ of a substantially stationary target with respect to the moving SAR sensor is always smaller than the SAR scan speed $v_S$, i.e., $|v_R| \leq v_S$. On the other hand, if the radar measures a radial relative velocity $v_R$ that is greater than the scan speed $v_S$, this is unambiguously due to a moving target. Therefore, the Doppler principle can be exploited to separate the substantially stationary targets signals, corresponding to velocity values $|v_R|<v_S$, from the moving target signals $|v_R| \geq v_S$. In other words, the SAR scan speed $v_S$ provides a boundary to discriminate among the SAR signals. This boundary is particularly restrictive both in the satellite and in the airborne SAR, in which cases $v_S$ is normally about 5000 m/s and 200 m/s, respectively, i.e., a value too high to be used as a criterion to distinguish moving targets from substantially stationary targets. On the contrary, in the case of GB-SAR systems, $v_S$ is about 0.05 m/s, and therefore only objects moving at a relative velocity lower than such a small value cannot be identified as moving objects.

As known, the radar system receives the backscattered signal within a predetermined field of view, defined by a field-of-view angle $\pm\theta_{FOV}$. In this case, according to the relationship [1], the maximum relative velocity $|v_R|$ that can be measured between the sensor and a substantially stationary target is $v_S \cdot \sin(\theta_{FOV})$. According to one embodiment, the radial velocity threshold can be set equal to this value. In facts, if the field-of-view angle is very narrow, it is possible to reduce considerably the limit on the velocity threshold.

The step of forming a radar image can be of different complexity levels. In some embodiments, it can merely consist of a step of associating coordinates of an image file to pixels of a display device. In other embodiments, it can even encompass more complex data processing procedures such as range-migration or time-domain back-projection algorithms, unless these steps have been already performed when Doppler-processing raw data, in particular, by radar sensor device.

In some further embodiments, the radar antenna unit comprises a plurality of antennas, and the step of scanning the scenario is actuated electronically, i.e., it is carried out by an electronic scan between the antennas. This way, faster scan times with no moving mechanical parts can be achieved. In this case, v* can be advantageously set to a very small value, which improves discriminating fast-moving targets from substantially stationary targets.

More in detail, the electronic scan can be selected among:
an electronic scan in which the antennas are actuated sequentially;
an electronic scan in which the antennas are actuated simultaneously;
a combination thereof.

In another embodiment, the step of scanning the scenario comprises a step of mechanically changing the orientation of the radar antenna unit within a predetermined angle including the scenario. The orientation of the radar antenna unit can be changed in azimuth and/or in elevation. In another aspect of the invention, the radar system can be a GB real aperture radar system (GB-RAR), and the scan means thereof is configured to mechanically change the orientation of the radar antenna unit, preferably both in azimuth and in elevation, in order to perform such a step of scanning the scenario. In comparison with a GB-SAR system, GB-RAR systems make it possible to achieve both azimuth and elevation resolution providing a 3D radar image.

Advantageously, the method also comprises the steps of:
obtaining position and speed measurements of the fast-moving target or targets;
forming a track of the fast-moving target or targets by iterating in the time the step of obtaining the position and speed measurements.

In another aspect of the invention, the computation means is configured thereto.

This way, a same radar system makes it possible both to monitor long-span phenomena such as ductile landslides, by interferometrically processing the radar image, and tracking possible fast-moving targets or fast events such as avalanches, rockfalls, and the like. Currently, these two results can only be obtained by two independent GB radar systems, with a significant increase in cost and power consumption.

Advantageously, the method also comprises the steps of:
associating the track to a hazard level based on the position and/or speed values;
providing an alarm signal responsive to the hazard level.

In another aspect of the invention, the computation means is configured thereto.

This way, a same radar system enables both obtaining alarms from long-span phenomena such as ductile landslides, and fast events such as avalanches, rockfalls, and the like. Such an alarm system can be usefully implemented from manned areas, where both long-span phenomena and fast events takes place, e.g. mines, construction sites and the like. Currently, these two kinds of alarms can only be obtained at once by two independent GB radar systems, with a significant increase in cost and power consumption.

BRIEF DESCRIPTION OF THE DRAWINGS

The invention will be now shown with the description of its exemplary embodiments, exemplifying but not limitative, with reference to the attached drawings, in which:

FIG. 1 schematically shows a ground-based radar system and a scenario including a plurality of targets;

FIG. 2 schematically shows a ground-based, synthetic aperture radar system and a scenario including a plurality of targets;

FIG. 3 is a detail of a single target in the scenario and with the system of FIG. 2, showing the relationship between the scan speed of the radar antenna unit and the relative radial velocity of that target, in which the velocity vectors are represented in a reference system integral to the radar antenna unit;

DESCRIPTION OF PREFERRED EMBODIMENTS OF THE INVENTION

With reference to the annexed drawings, a method is described for mitigating the blurring effect in ground-based radar images of a scenario 1 including a plurality of targets $2_j$, 3, as shown in FIG. 1, schematically depicting a GB radar system 10 including a radar antenna unit 20 and a radar sensor unit 30.

Figure 4:
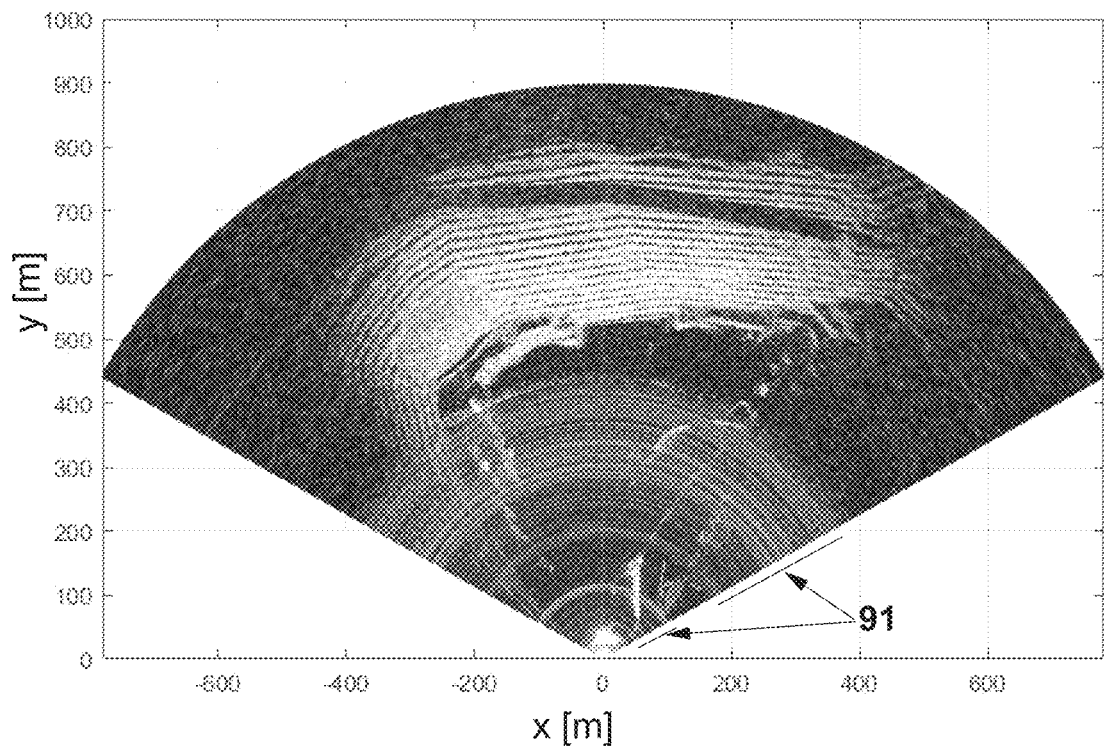
FIG. 4-6 are GB-SAR images showing blurring effects, i.e., artifacts caused by moving objects in that are present in the scenarios.
Figure 5:
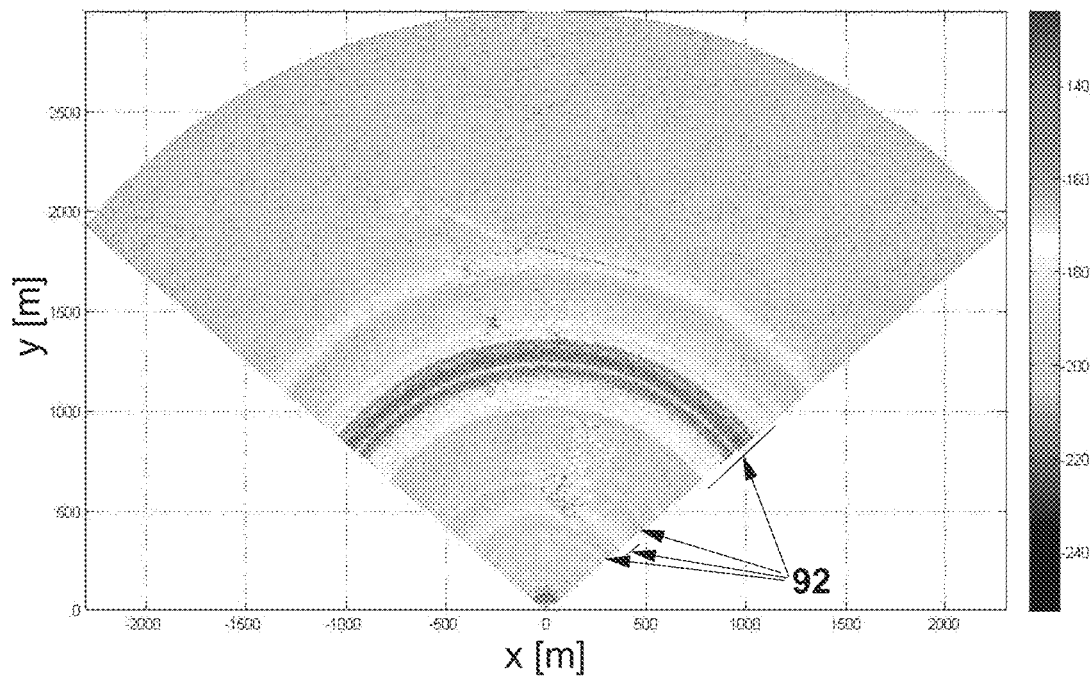
Figure 6:
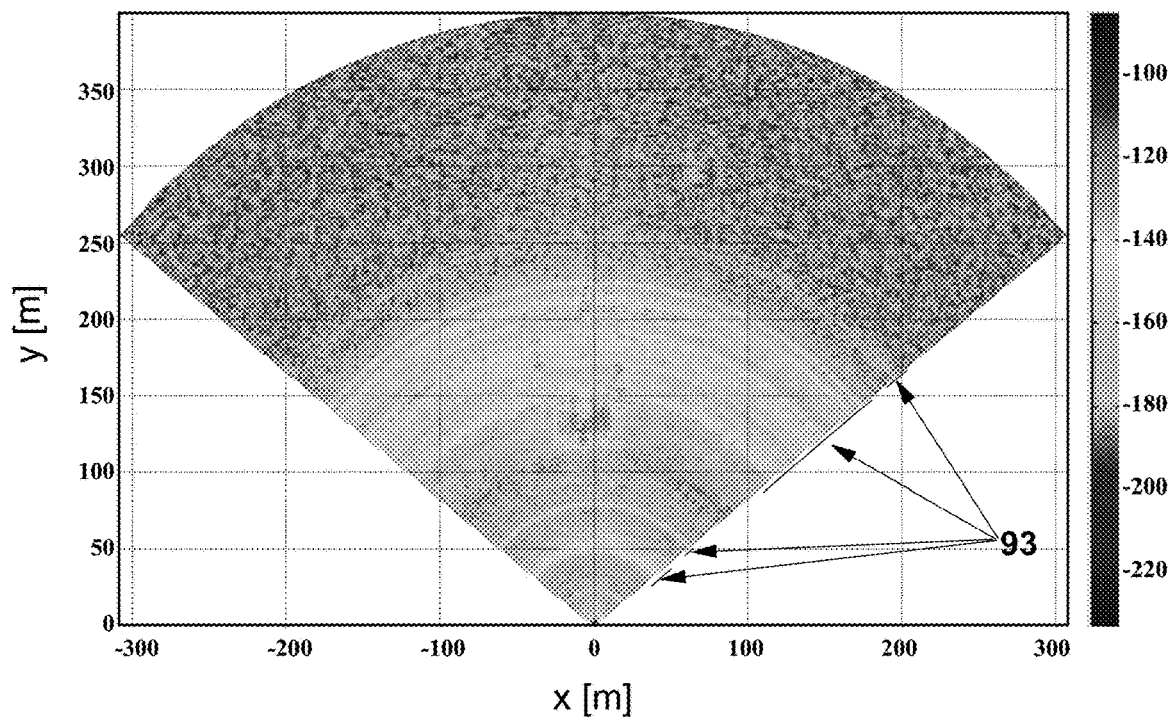
Figure 7:
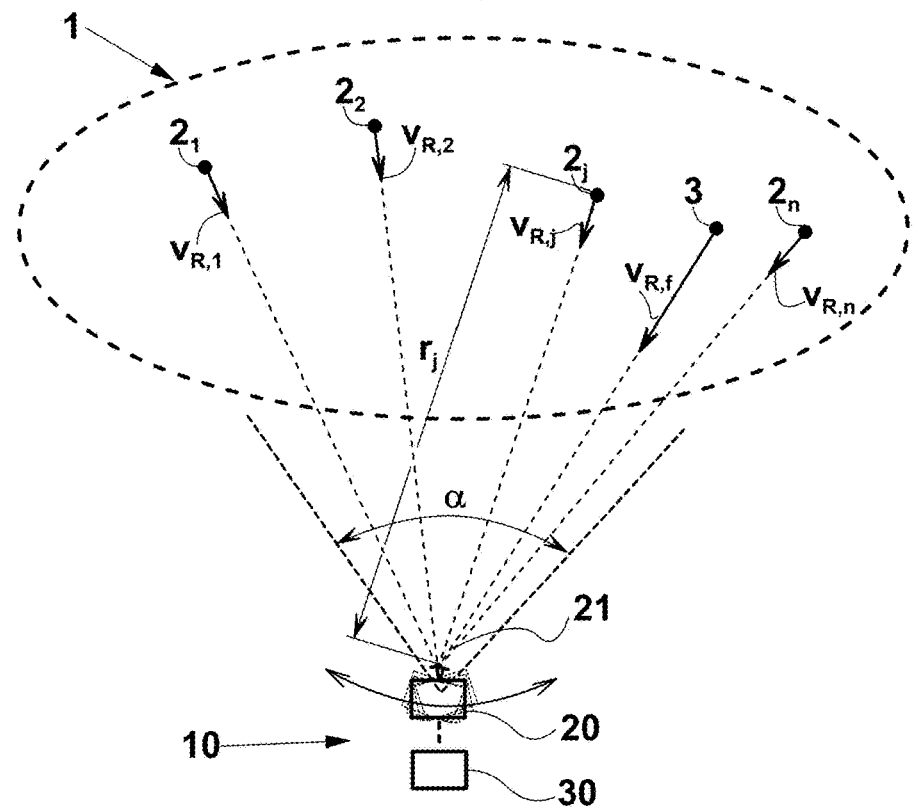
FIG. 7 schematically shows a ground-based radar system configured to change the orientation of its radar antenna unit within a predetermined angle including a scenario including a plurality of targets.

The description encompasses both radar systems in which scenario 1 is scanned mechanically, i.e., by moving a single antenna 21 of radar antenna unit 20, FIGS. 2 and 7, and radar systems in which scenario 1 is scanned electronically by actuating multiple antennas $21_1$, $21_2$, ... $21_m$ of radar antenna unit 20, FIGS. 8-10.

More in detail, FIGS. 2 and 7 schematically show mechanically scanned SAR and RAR systems 10, respectively.

With reference to FIG. 7, GB radar system 10 can be a GB-RAR system in which step 120 of scanning scenario 1 is actuated mechanically by changing the orientation of radar antenna unit 20 within a predetermined angle α, so as to include scenario 1.

Figure 8:
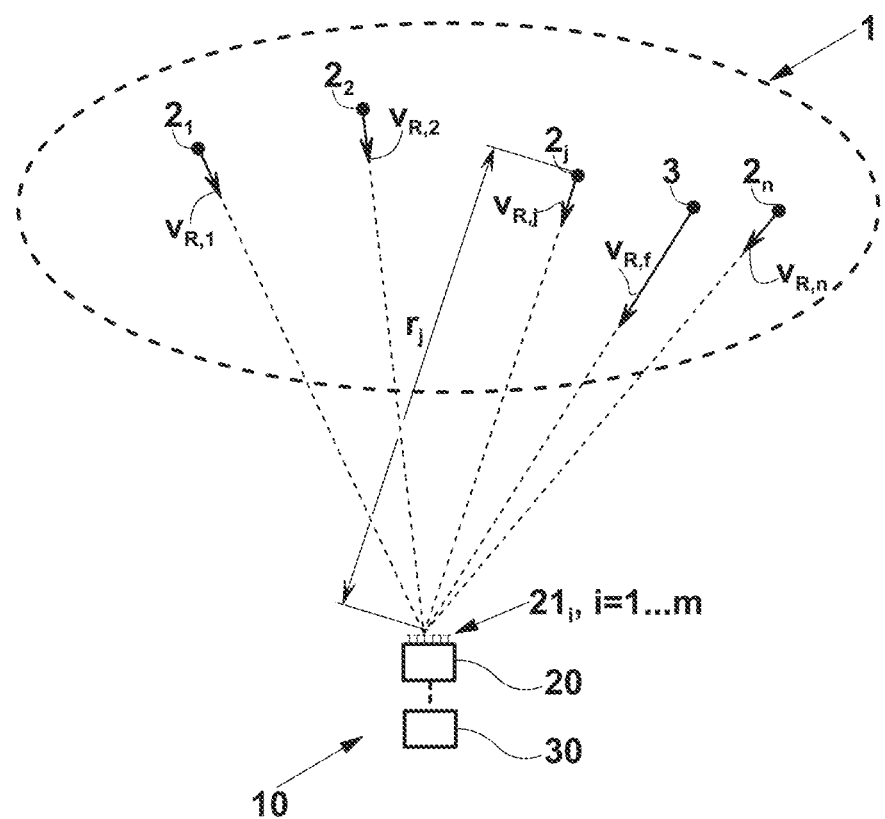
FIG. 8 schematically shows a ground-based radar system comprising a plurality of antennas and configured to perform a step of scanning a scenario.
Figure 9:
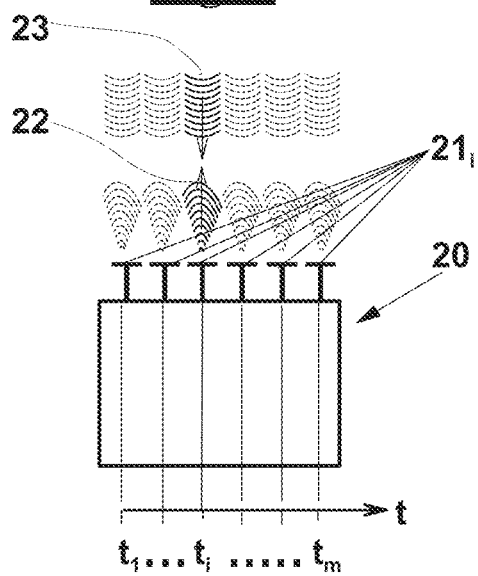
FIG. 9 shows a detail of the radar system of FIG. 8, in which the antennas are actuated sequentially.
Figure 10:
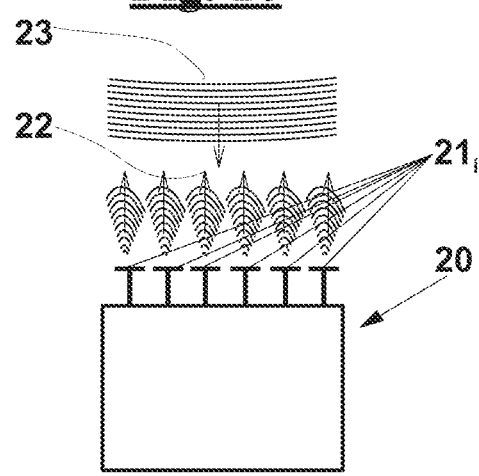
FIG. 10 shows a detail of the radar system of FIG. 8, in which the antennas are actuated simultaneously.

In electronically scanned radar system 10 of FIG. 8, antennas 21 can be actuated in transmission and reception according to a time program, in particular they can be actuated sequentially, FIG. 9, or simultaneously, FIG. 10. In the former case, antennas $21_i$, i=1 ... m can be sequentially caused to emit transmission signals 22 and to receive backscattered signals 23 from targets $2_j$, 3 each during a fraction of a predetermined scan period. Backscattered signals 23 are combined and processed as well known to a skilled person. In the latter case, the antennas $21_i$, i=1 ... m emit and receive at the same time.

In the method, an image 40 of scenario 1, including a plurality of targets $2_1$, $2_2$, ... $2_n$ and 3, is basically obtained by performing steps 100 to 160 schematically depicted in the block diagram of FIG. 11 after selecting a radial velocity threshold v*, step 101, which is the limit velocity above which the contribution of moving objects to image 40 can be suppressed by the method.

More in detail, the selected value of radial velocity threshold v* makes it possible to distinguish, among targets $2_j$ and 3, a plurality of substantially stationary targets $2_j$, the radial velocity $v_{R,\ j}$ of which is lower than or equal to selected radial velocity threshold v*, and one or more fast-moving targets 3, the radial velocity $v_{R,\ f}$ of which is higher than selected radial velocity threshold v*.

Substantially stationary targets $2_j$ include therefore the targets to be monitored in scenario 1, for instance orographic or structural elements whose possible displacement are the object that must be investigated by GB radar system 10.

For the sake of simplicity, only one fast-moving target 3 is shown in FIGS. 1, 2, 7 and 10 and taken into consideration in the description, the extension to a plurality of fast-moving targets being obvious for a skilled person. Fast-moving targets 3 are elements that can be accidentally or systematically present in the scenario, for instance, vehicles in a mine, or other mechanical means used to displace objects such as rocks or construction materials in a building site, or plants moving under the action of the wind, and the like.

Figure 11:
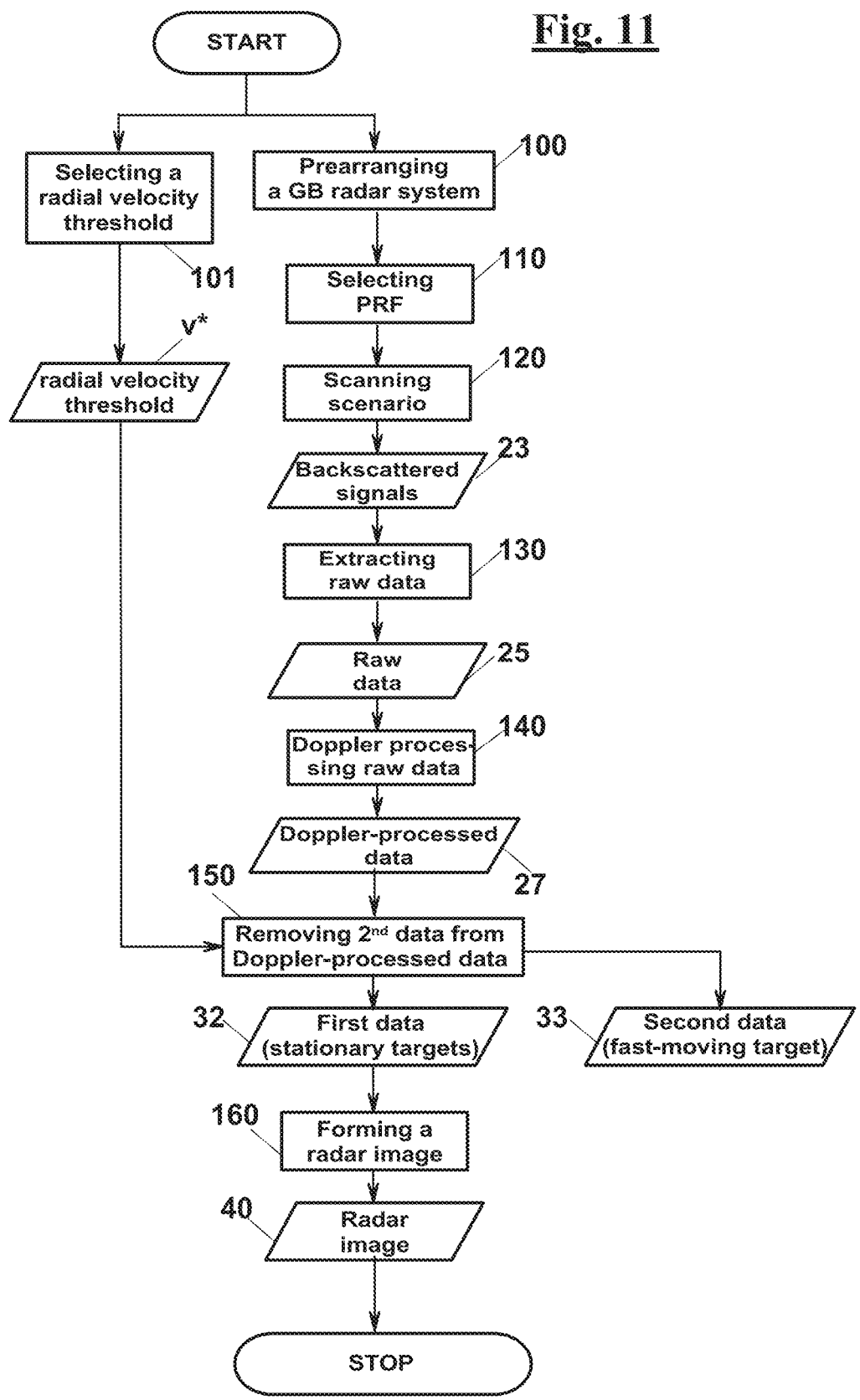
FIG. 11 shows a flowchart of the method according to the invention.

Still with reference to FIG. 11, after a step 100 of conventionally prearranging radar system 10 in a suitable position with respect to scenario 1, a step 110 is carried out of selecting a Pulse Repetition Frequency value, i.e., the number of pulses the radar antenna unit will transmit in one time-unit by, such that the radial velocity measurements can be obtained up to a maximum unambiguous velocity $v_{max}=\lambda/4\times(PRF)$ of the targets $2_j$, 3.

Subsequently, radar system 10 is operated by performing a step 120 of scanning scenario 1 by radar antenna unit 20 of GB radar system 10 is performed mechanically, FIG. 2 or 7, or electronically, FIGS. 8-10.

By step 120 of scanning scenario 1, radar antenna unit 20 is conventionally caused to emit transmission signals 22 and to receive backscattered signals 23 from targets $2_j$, 3 in response to transmission signals 22. In this connection, the main tasks of radar sensor unit 30 consists in generating transmission signals 22 to radar antenna unit 20 according to some parameters depending upon the specific application, and to convert backscattered signals 23, received from antenna unit 20, into digital data.

This way, measurements of the range $r_j$ and of the radial velocity $v_{R,\ j}$ and $v_{R,\ f}$ are obtained for each target $2_j$ and 3 up to a maximum unambiguous velocity $v_{max}$ depending upon selected Pulse Repetition Frequency (PRF) value according to the relationship $v_{max}=\lambda/4\times(PRF)$, as anticipated.

A step 130 follows of extracting raw data 25 related to targets $2_j$, 3 from backscattered signals 23, which are subsequently Doppler-processed in step 140, thus obtaining Doppler-processed data 27 containing, in particular, radial velocity measurements $v_R$.

Doppler processing 140 enables distinguishing first data 32 related to stationary targets $2_j$, and second data 33 related to fast-moving target 3, according to whether the measured radial velocity $v_R$ are lower or not lower than radial velocity threshold v*, respectively. This way, second data 33 can be removed from Doppler-processed data in a step 150, thus obtaining first data 32 only. First data 32 relate to stationary targets 2j including those of interest, and are subjected to further processing.

In fact, a step 160 of forming a radar image 40 of scenario 1 from first data 32 is carried out. Step 160 of forming a radar image 40 can be of different complexity levels. In some embodiments, it can merely consist of a step of associating coordinates of an image file to pixels of a display device. In other embodiments, it can even encompass complicated data processing procedures such as range-migration or time-domain back-projection algorithms, unless these steps have been already performed when Doppler-processing raw data, in particular, by radar sensor device 30.

The contribution of fast-moving target 3 is excluded from radar image 40, and only the contributions of substantially stationary targets $2_j$ are present. These are the contribution of all substantially stationary targets $2_j$ moving at a radial velocity $v_{R,\ j}$ lower than radial velocity threshold v*. Therefore, stationary targets $2_j$ include the targets of interest along with possible targets moving at a radial velocity lower than previously defined threshold v*.

Therefore, the lower preliminary selected radial velocity threshold v*, the lower the amount of contributions of moving objects in the radar image 40.

In particular, Pulse Repetition Frequency (PRF) can be set at a value such that maximum unambiguous velocity $v_{max}=\lambda/4\times(PRF)$ higher than radial velocity $v_{R,\ f}$ of fast-moving target 3.

As anticipated, with reference to FIG. 2, the GB radar system can be a GB-SAR system in which step 120 of scanning scenario 1 is actuated mechanically by changing the position of radar antenna unit 20 at a scan speed $v_s$ along a trajectory γ. In this case, radial velocity threshold v* can be set equal to scan speed $v_s$.

Figure 12:
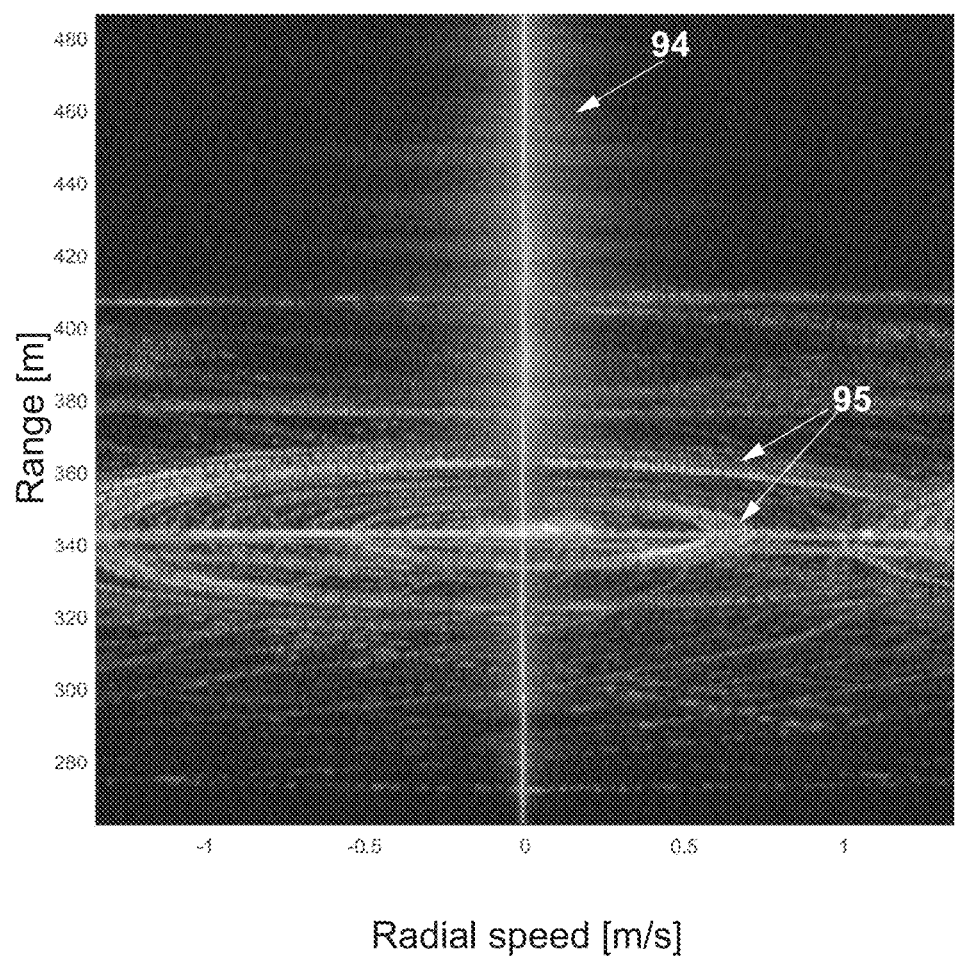
FIG. 12 is a range-velocity map of a scenario including both substantially stationary and fast-moving objects, obtained by a GB-SAR system.
Figure 13:
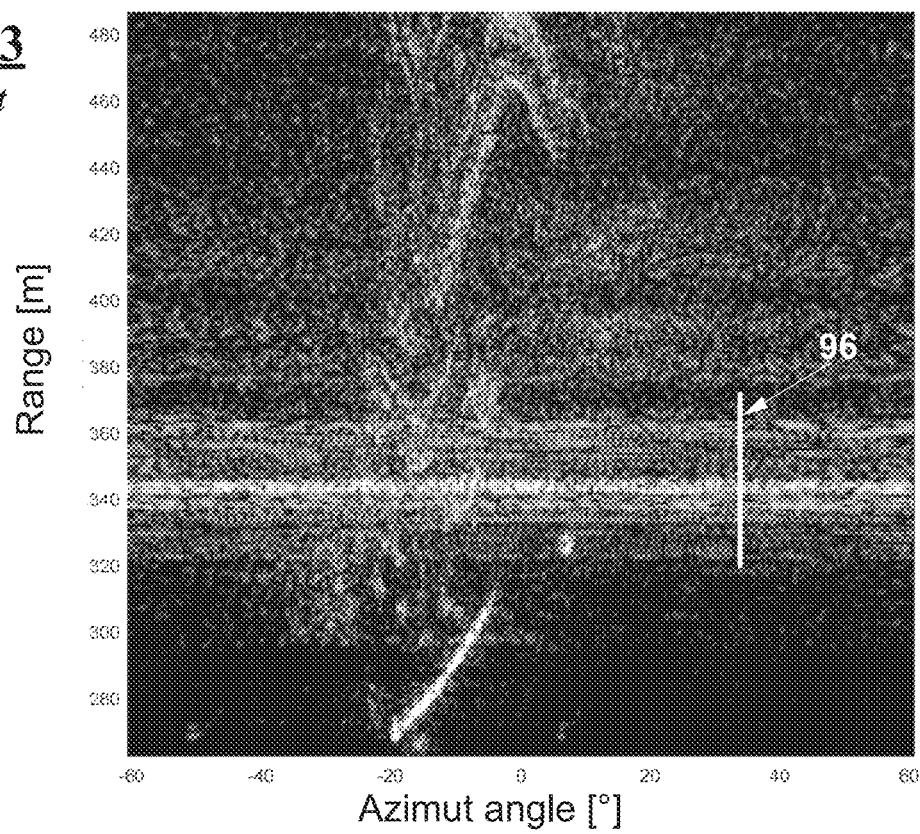
FIG. 13 is an azimuth-range map of the same scenario as in FIG. 12, obtained by operating the GB-SAR system according to the prior art.
Figure 14:
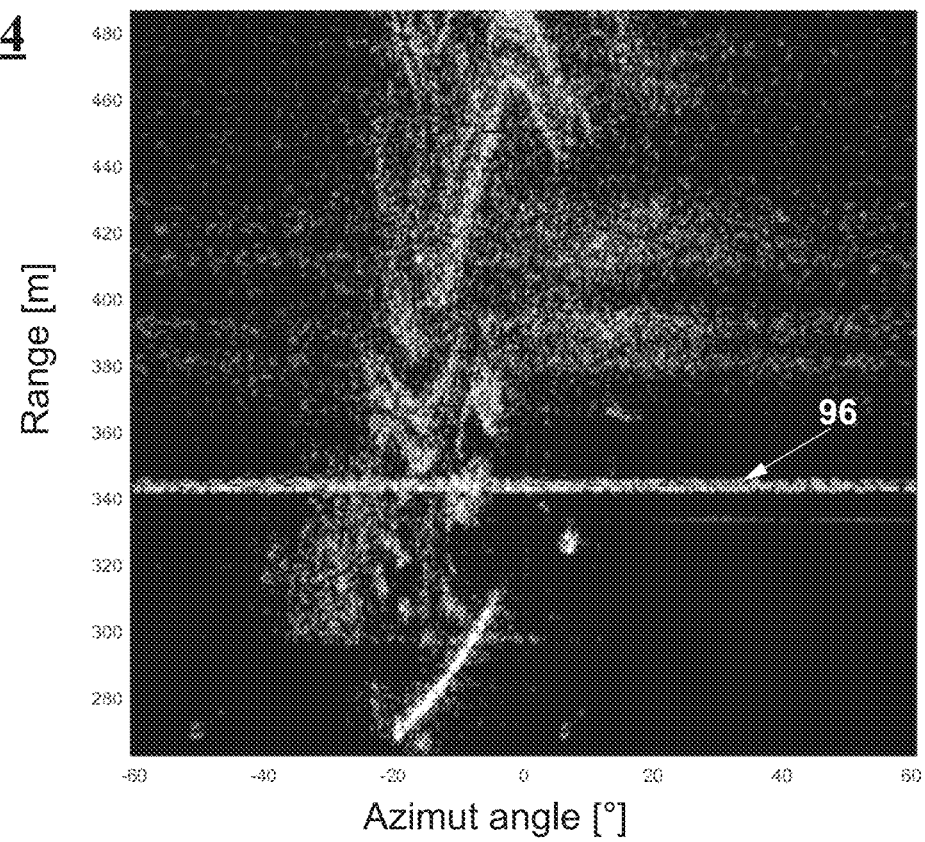
FIG. 14 is an azimuth-range map of the same scenario as in FIG. 12, obtained by operating the GB-SAR system according to the method of the invention.

The advantages provided by the method according to the invention, in the case of a GB-SAR system, can be readily understood when considering FIGS. 12-14.

FIG. 12 show GB-SAR Doppler-processed data in the form of a range-velocity map of a scenario in which a crane is moving. Signals 94 related to stationary targets can be recognized at radial speed 0 m/s, along with signals 95 from the moving crane, displayed as elliptical traces between ranges of 320 m and 370 m, and signals from windblown vegetation mainly present between radial speeds of −0.25 m/s and +0.25 m/s.

FIGS. 13 and 14 are azimuth-range maps of the same scenario as in FIG. 12, obtained by operating the GB-SAR system according to the prior art and according to the method of the invention, respectively. The effectiveness of the method of the invention can be assessed by comparing FIGS. 13 and 14. In FIG. 13, artifacts 96 due to the moving crane can be recognized between ranges of 320 m and 370 m. As shown in FIG. 14 shows, most of artifacts 96 are suppressed, thanks to the method according to the invention. The only residual artefacts 96 are in a band about a range of 345 m, corresponding to the part of the jib of the crane that is most close to the mast, which turns about the mast at a peripheral velocity lower than radial velocity threshold v*.

Figure 15:
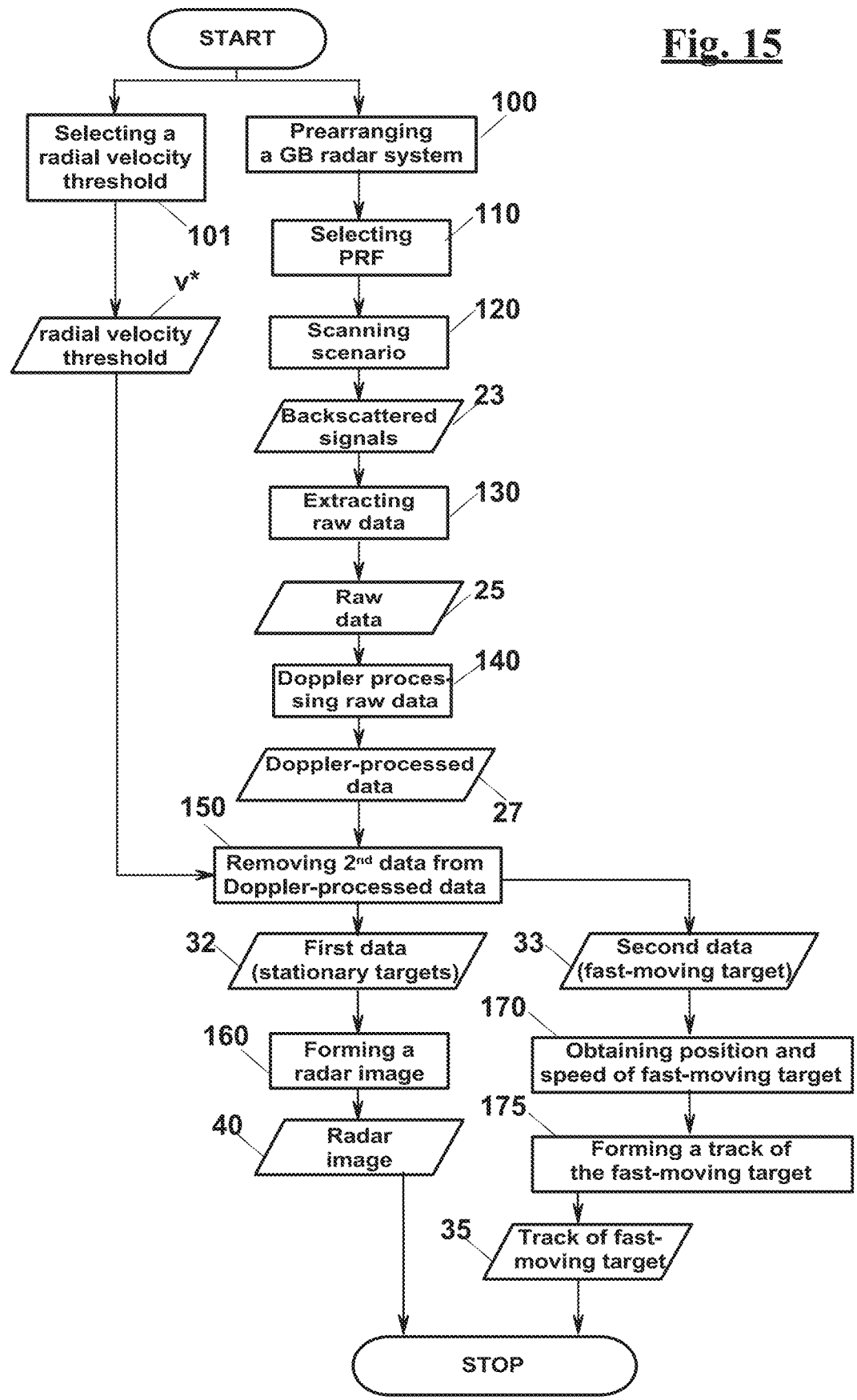
FIG. 15 show a flowchart of the method according to another aspect of the invention, in which a track of a fast-moving target is obtained.

With reference to FIG. 15, in another aspect of the invention, the method can also comprise a step 170 of obtaining range and radial velocity measurements also of at least one fast-moving target 3, followed by a step 175 of forming a track 35 of fast-moving target 3, by iterating in the time step 170 of obtaining the measurements pertaining fast-moving target 3.

Figure 16:
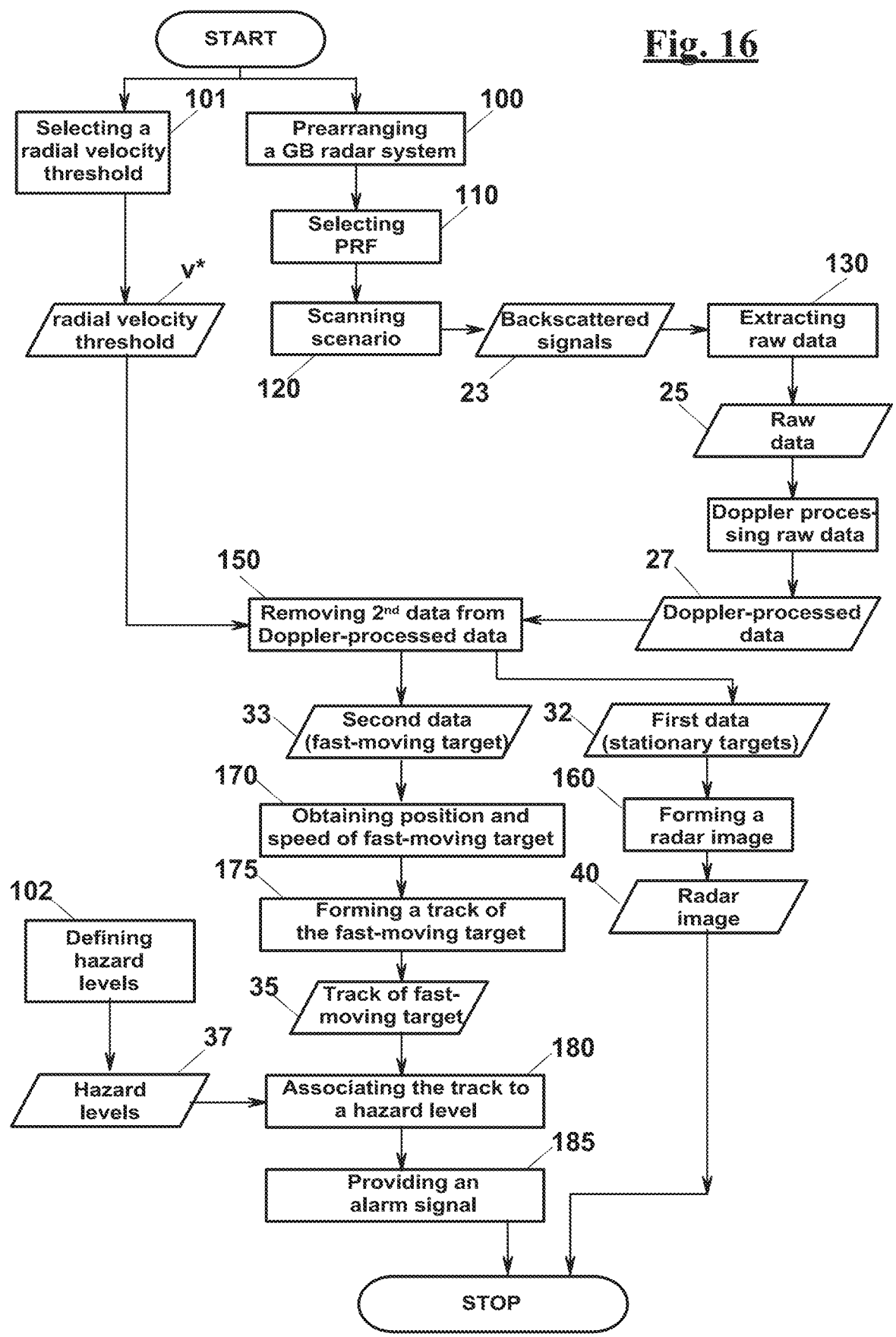
FIG. 16 show a flowchart of the method according to the same aspect of the invention, in which the track of a fast-moving target is associated to a hazard level to provide an alarm signal.

In particular, as shown in FIG. 16, in an embodiment, the method can also comprise a preliminary step 102 of defining a plurality of hazard levels 37 in connection with possible consequences of the displacement of fast-moving target 3 in scenario 1, in particular if the scenario also includes operators 1 or in any case living beings, or valued goods. Once track 35 has been formed as described above, a step 180 is provided of associating track 35 to one of said hazard levels 37 based on the position and/or speed values, possibly followed by a step 185 of providing an alarm signal responsive to the hazard level 37.

The foregoing description exemplary embodiments and specific examples of the invention will so fully reveal the invention according to the conceptual point of view, so that others, by applying current knowledge, will be able to modify and/or adapt such embodiments for various applications without further research and without parting from the invention, and, accordingly, it is to be understood that such adaptations and modifications will have to be considered as equivalent to the specific embodiment and to the examples. The means and the materials to perform the various functions described herein could have a different nature without, for this reason, departing from the scope of the invention. It is to be understood that the phraseology or terminology that is employed herein is for the purpose of description and not of limitation.

BIBLIOGRAPHIC REFERENCES

1) Andreas Jungner, "Ground-Based Synthetic Aperture Radar Data Processing for Deformation Measurement", Master's of Science Thesis in Geodesy No. 3116, TRITA-GIT EX 09-11 Division of Geodesy Royal Institute of Technology (KTH) Stockholm, Sweden, May 2009
2) Cuenca, Marc Lort, "Contribution to ground-based and UAV SAR systems for Earth observation", thesis submitted to the Universitat Politecnica de Catalunya, Barcelona, Spain, 2017
3) Marc Lort et al, "Impact of wind-induced scatterers motion on GB-sar imaging", IEEE journal of selected topics in applied Earth observations and remote sensing, vol. 11, No. 10, 1° ottobre 2018, pages 3757-3768.

The invention claimed is:

1. A method for mitigating the blurring effect in a ground-based-radar image of a fixed scenario selected among orographic elements, building sites, construction sites and mines, said method comprising the steps of:
    prearranging a ground-based synthetic aperture radar system in a ground-based position with respect to said fixed scenario,
    said ground-based radar system including a ground-based radar antenna unit and a radar sensor unit,
    said radar sensor unit arranged to obtain respective range measurements and respective radial velocity measurements of a plurality of targets in said fixed scenario,
    selecting, in said radar sensor unit, a Pulse Repetition Frequency value such that said radial velocity measurements can be obtained up to a maximum unambiguous velocity of said targets;
    setting a radial velocity threshold, said radial velocity threshold defining, among said targets:
        a plurality of substantially stationary targets selected as predetermined portions of said fixed scenario having radial velocities lower than or equal to said radial velocity threshold;
        at least one fast-moving target having a radial velocity higher than said radial velocity threshold, said fast-moving target selected among a vehicle in a mine and a mechanical means arranged to displace objects such as rocks or construction materials;
    scanning said fixed scenario from said ground-based position by said radar system, including steps of causing said radar antenna unit to emit transmission signals and of receiving backscattered signals from respective said targets in response to said transmission signals;
    extracting raw data from said backscattered signals, said raw data related to said targets including said substantially stationary targets and said fast-moving target;
    Doppler-processing said raw data, obtaining Doppler-processed data containing said radial velocity measurements, in order to discriminate:
        first data that are related to said substantially stationary targets, and
        second data that are related to said fast-moving target, according to whether said radial velocity measurements are lower or not lower than said radial velocity threshold, respectively;
    removing said second data from said Doppler-processed data, obtaining said first data alone, which are related to said substantially stationary targets;
    forming a blurring-mitigated radar image of said fixed scenario from said first data of said radar image by representing only said substantially stationary targets,
    wherein a step is provided of setting an expected value of said radial velocity of said fast-moving target, or of a fastest moving target, if more than one fast-moving target are present in said fixed scenario, and said Pulse Repetition Frequency value of said radar sensor unit is selected in such a way that said maximum unambiguous velocity is higher than an expected value of said radial velocity of said fast-moving target, or of said fastest moving target, if more than one fast-moving target are present in said fixed scenario, wherein said step of scanning said fixed scenario comprises a step of mechanically changing the position of said radar antenna unit along a trajectory at a predetermined scan speed, said radar antenna unit having a predetermined field-of view angle, wherein said radial velocity threshold is set equal to a value selected from the group comprised of:

said scan speed;

a maximum relative radial velocity that can be measured between the sensor and a substantially stationary target, said maximum relative radial velocity calculated as $v_S \sin(\theta_{FOV})$, where $v_S$ is said scan speed and $\theta_{FOV}$ is said field-of-view angle.

2. A method according to claim 1, comprising steps of:

obtaining position and speed measurements of said fast-moving target;

forming a track of said fast-moving target by iterating in the time said step of obtaining said position and speed measurements.

3. A method according to claim 2, comprising steps of:

defining a plurality of hazard levels;

associating said track to a hazard level based on said position and/or speed measurements;

providing an alarm signal responsive to said hazard level.

4. A ground-based synthetic aperture radar system arranged in a ground-based position with respect to a fixed scenario selected among orographic elements, building sites, construction sites and mines, said ground-based radar system including a ground-based radar antenna unit and a radar sensor unit, said radar sensor unit arranged to obtain respective range measurements and respective radial velocity measurements of a plurality of targets that are present within said fixed scenario;

said radar sensor unit configured with a Pulse Repetition Frequency such that said radial velocity measurements can be obtained up to a maximum unambiguous velocity, said radar sensor unit configured with a predetermined radial velocity threshold, said radar sensor unit including a scan means for causing said radar antenna unit to emit transmission signals and to receive backscattered signals in response to said transmission signals from respective said targets, in such a way to scan said fixed scenario from said ground-based position;

a computation means for:

extracting raw data from said backscattered signals, said raw data related to said targets;

Doppler-processing said raw data, obtaining Doppler-processed data containing said radial velocity measurements;

discriminating between:

first data that are related to substantially stationary targets selected as predetermined portions of said fixed scenario, and second data that are related to fast-moving targets selected among a vehicle in a mine and a mechanical means arranged to displace objects such as rocks or construction materials, wherein said discriminating is carried out by said computation means according to whether said radial velocity measurements are lower or not lower than said radial velocity threshold, respectively;

removing said second data from said Doppler-processed data, so as to obtain said first data alone, which are related to said substantially stationary targets; and forming a blurring-mitigated radar image of said fixed scenario from said first data of said radar image by representing only said substantially stationary targets, wherein said radar sensor unit is configured with an expected value of said radial velocity of said fast-moving target, or of a fastest moving target, if more than one fast-moving target are present in said fixed scenario, and said Pulse Repetition Frequency value of said radar sensor unit is selected in such a way that said maximum unambiguous velocity is higher than an expected value of said radial velocity of said fast-moving target, or of said fastest moving target, if more than one fast-moving target are present in said fixed scenario, wherein the scan means is configured to mechanically actuate a step of scanning the scenario comprising a step of mechanically changing the position of the radar antenna unit along a trajectory at a predetermined scan speed, said radar antenna unit having a predetermined field-of view angle, wherein said radar sensor unit is configured with a predetermined radial velocity threshold that is set equal to a value selected from the group comprised of:

said scan speed;

a maximum relative radial velocity that can be measured between the sensor and a substantially stationary target, said maximum relative radial velocity calculated as $v_S \sin(\theta_{FOV})$, where $v_S$ is said scan speed and $\theta_{FOV}$ is said field-of-view angle.

* * * * *